ably at a location remote from the building site, by the manufacture of lightweight concrete, polystyrene-bead materials of particularly controlled characteristics in regard to bead size and coefficient of variation of absolute volume, there is obtained a substantial improvement in regard to the accuracy with which the density of the product lightweight concrete can be controlled or preordained. Since the strength and insulation-value properties are closely related to the density, the improvement aids in the design and production of more economical parts.

United States Patent [19]

Rady-Pentek et al.

[11] 4,040,855

[45] Aug. 9, 1977

[54] MANUFACTURE OF LIGHTWEIGHT CONCRETE

[76] Inventors: Arthur A. Rady-Pentek, 3379 Rte. 46, Apt. 14-F, Parsippany, N.J. 07054; Edwin William Fairweather, 21894 Knudsen Drive, Grosse Ile, Mich. 48138

[21] Appl. No.: 601,254

[22] Filed: Aug. 4, 1975

[51] Int. Cl.² ............................................. C04B 7/35
[52] U.S. Cl. ...................................... 106/90; 106/97; 260/29.65
[58] Field of Search .................. 106/90, 97; 260/29.65

[56] References Cited

U.S. PATENT DOCUMENTS

| | | | |
|---|---|---|---|
| 3,021,291 | 2/1962 | Thiessen | 106/90 |
| 3,272,765 | 9/1966 | Sefton | 106/90 |
| 3,869,295 | 3/1975 | Bowles et al. | 106/90 |
| 3,883,359 | 5/1975 | Harvey | 106/90 |

*Primary Examiner*—J. Poer

[57] ABSTRACT

By using as the lightweight aggregate, in the manufacture of lightweight concrete, polystyrene-bead materials of particularly controlled characteristics in regard to bead size and coefficient of variation of absolute volume, there is obtained a substantial improvement in regard to the accuracy with which the density of the product lightweight concrete can be controlled or preordained. Since the strength and insulation-value properties are closely related to the density, the improvement aids in the design and production of more economical parts.

4 Claims, No Drawings

MANUFACTURE OF LIGHTWEIGHT CONCRETE

BACKGROUND OF THE INVENTION

1. Field of the Invention

This invention relates in one aspect to the production of an expanded polystyrene-bead product, and in particular, the invention relates to the use of such product as a lightweight aggregate in the production of lightweight concrete compositions.

2. Description of the Prior Art

The manufacture of expandable polystyrene beads has been practiced in the United States for about twenty years. Those skilled in the art are well familiar with the practices necessary to yield polystyrene beads which have a diameter on the order of 0.35 to 1.30 millimeters and also contain a suitable proportion of a blowing or expanding agent, such that when the unexpanded beads are subjected to heat, they expand from an original specific gravity on the order of 0.625 to a lower specific gravity such as 0.01 to 0.05. Apparatus for causing such expansion is known, such as that shown in Rodman U.S. Pat. No. 3,023,175. It is known, moreover, that the product from the operation for producing the unexpanded beads may be screened to produce various size-fractions from the output of the bead-producing operation. For example, there may be made a size fraction of unexpanded polystyrene beads which is 100 percent by weight between 1.29 and 0.35 millimeters in diameter and over 90 percent by weight of a diameter between 1.24 and 0.58 millimeters, i.e., a somewhat coarse product, with a great proportion of its particles typically having diameters between 0.65 and 1.0 millimeters. There may also be made a size fraction somewhat finer, i.e., having 100 percent by weight between 1.04 and 0.35 millimeters in diameter and having over 90 percent by weight of its particles between 0.9 and 0.4 millimeters, with a great portion of its particles thus ranging in diameter from 0.85 to 0.45 millimeters. Expanding the particles from a specific gravity of 0.625 to a specific gravity of 0.016 increases the diameter of the particles by a factor of about 3.4.

Although various other uses for polystryene-bead products are well known, we are particularly concerned with the use of such beads as a lightweight aggregate in the production of a lightweight concrete, such as the compositions disclosed in U.S. Pat. Nos. 3,214,393; 3,257,338; and 3,272,765. The lightweight concretes have, for example, specific gravities of 0.35 to 1.05, in comparison with values of 2.24 to 2.56 for conventional concrete. The polystyrene lightweight concretes do not have values as great in regard to compressive strength, giving rather typically 0.21 to 0.56 kilograms per square millimeter (300 to 800 pounds per square inch), where conventional concrete has a compressive strength of about 2.8 to 3.5 kilograms per square millimeter (4000 to 5000 pounds per square inch), but the polystyrene lightweight concretes are greatly superior in thermal insulating value, having efficients of thermal conductivity on the order of one-fourth to one-ninth as great as those of conventional concrete.

Lightweight concretes of low density, such as about 0.48 to 0.52 in specific gravity, have been used for roof fill. Material somewhat more dense (specific gravity of 0.52 to 0.64) is useful for curtain walls. Material of specific gravity 0.60 to 0.64 is useful as a sub-base for highways, railway rights-of-way, aircraft runways, and similar applications in which it is desirable to protect the sub-grade from repetitive freezing and thawing. Materials of specific gravity over 0.64 are useful as load-bearing walls and as fire walls.

The procedures for obtaining lightweight concrete having a desired specific gravity (within a broad, inexact range of target value plus or minus 0.03 or 0.05) are known to those skilled in the art. The polystyrene beads are expanded to the desired and proper degree, and then they are mixed with proportions of cement, water, sand (in at least most cases), and certain additives such as an air-entrainment agent (AEA) and a water-reducing admixture (WRA). It has been known that even at a particular density, the proportion of cement and sand may be varied somewhat; to obtain greater strength, it is usually possible, within limits, to use more cement and correspondingly less sand. In some instances, sand may be omitted altogether. On the other hand, whenever the strength is not needed, one may save money by using relatively more sand and less cement. The proportions of AEA used may also be varied, within limits, to influence the density of the product. In accordance with the prior art, however, it has not been possible to control or preordain in the specific gravity (density) of the product any more accurately than to the degree indicated above, that is, target value plus or minus 0.03 to 0.05. Such a range leaves considerable uncertainty in regard to the strength and thermal-insulating properties that will be obtained in the product lightweight concrete.

In accordance with practices known before the present invention, an attempt to make a concrete with a specific gravity of 0.640 grams per cubic centimeter (40 pounds per cubic foot) might yield one of only 0.576 (36 pounds per cubic foot). Such a concrete has a compressive strength of 20.4 to 23.9 kilograms per square centimeter (290 to 340 pounds per square inch) and a thermal conductivity of 0.144 to 0.180 watts per degree Kelvin-meter or 1.0 to 1.25 Btu/(hr) (ft.$^2$) ($°$F/in.). On the other hand, it might yield a concrete of 0.688 grams per cubic centimeter (43 pounds per cubic foot). Such a concrete has a compressive strength of 24.6 to 38.7 kilograms per square centimeter (350 to 550 pounds per square inch) and a thermal conductivity of 0.173 to 0.216 watts per degree Kelvin-meter, or 1.2 to 1.5 Btu/(hr.) (ft.$^2$) ($°$F./in.). Given this great variability, a designer had no choice but to use sufficient material to have the necessary strength and insulating values, assuming the most favourable case. A practice which permits the density and other properties to be accurately predetermined thus makes it possible to save at least 5 to 10 percent on the amount of material used, and in the case that the insulating value is the principal consideration, as much as 50 percent in some cases.

In the prior art of which we are aware it has been taught that the size of the polystyrene beads used in making lightweight concrete is not critical. The three above-mentioned United States patents each contain a specific embodiment to that effect, and they mention among them the use of expanded beads with diameters of 0.59 to 6 millimeters, with 3.175 millimeters being a typical diameter. This corresponds to the use of unexpanded beads having a diameter of 0.17 to 1.7 millimeters, with 0.94 millimeters being a typical value.

SUMMARY OF THE INVENTION

We have discovered that a considerable improvement in the controllability of the density or specific gravity of the product lightweight concrete (and consequently, in the controllability of its strength and insulating-value properties) can be obtained by paying close attention to (1) the particle-diameter distribution of the unexpanded beads used and (2) the coefficient of variation of the absolute volume of expanded polystyrene particles intended for use in the making of lightweight concrete. In particular, we find that by mixing one part by weight of a somewhat finer fraction of beads with about three parts by weight of a somewhat coarser fraction of beads, under conditions such that a low coefficient of variation $C_V$ in absolute volume (as hereinafter defined) of under 3.0 and preferably about 2.10 is obtained, we can produce a polystyrene-bead product which, when expanded to a specific gravity of about 0.016, can be used to produce a lightweight-concrete product which will have a desired specific gravity, plus or minus 0.024 or less.

DESCRIPTION OF THE PREFERRED EMBODIMENTS

The first step, in the making of a polystyrene-bead product according to the present invention, and ultimately producing therefrom the desired lightweight-concrete product of controlled density, is the preparation of a suitably fine-particled fraction of unexpanded polystyrene beads. It will be apparent to those skilled in the art how a fraction of the suitable size may be obtained through conventional methods, such as screening. In accordance with the present invention, this fine-particled fraction has unexpanded beads that are 100 percent by weight of a diameter between 1.04 and 0.35 millimeters, and 90 percent by weight of a diameter between 0.9 and 0.4 millimeters. To be somewhat more precise, a suitable material may have a particle-size analysis as indicated in the following Table.

Table

| Diameter, Millimeters | % by Weight |
|---|---|
| >1.04 | 0 |
| >0.87 | 5 max. |
| >0.70 | 60 max. |
| >0.42 | 99 min. |
| 0.42–0.37 | 1 max. |
| <0.37 | 0 |

Such product has a volatiles content of 5.8 to 7.0 percent by weight, and a bulk density of approximately 625 kilograms per cubic meter (39 pounds per cubic foot).

The next step in the making of the product is the production of a suitable relatively coarse-particled fraction of unexpanded polystyrene beads. In accordance with the invention, such polystyrene-bead fraction consists of particles which in their unexpanded form are substantially all of a diameter between 1.29 and 0.35 millimeters, and 90 percent of them by weight are of a diameter between 1.24 and 0.58 millimeters. More particularly, desirable results are obtained when this fraction has a particle-size distribution as indicated in the following Table.

Table

| Diameter, Millimeters | % by Weight |
|---|---|
| >1.29 | 0 |
| <1.24 | 5 max. |
| >1.18 | 20 max. |
| >0.58 | 95 min. |
| 0.58–0.45 | 5 max. |
| <0.45 | 1 max. |
| <0.35 | 0 |

This product has the same bulk density and the same volatiles content as the other fraction discussed above.

The next step comprises the expanding and curing of the fine- and coarse-particled bead fractions. Each is expanded to a suitable nominal density, such as 0.013 to 0.019 grams per cubic centimeter (0.80 to 1.20 pounds per cubic foot), preferably about 0.016 grams per cubic centimeter (1 pound per cubic foot). Greater expansion gives lower strength, and less expansion gives poorer insulating properties to the product lightweight concrete. The particle fractions may be expanded separately and then mixed, or may be mixed prior to expansion. It is desirable in the expansion operations to operate under conditions as nearly stable as possible, holding the density of the product closely to the desired value by repeated and frequent monitoring of the density of the product; once every five or ten minutes, a sample of beads emerging from the expander is put into a container of known volume and weighed to determine whether the density is being maintained at the desired value. If the product is becoming too dense, the usual corrective measure is to increase the residence time in the expander by reducing the rate at which unexpanded beads are fed to the expander. If the product begins to become overexpanded, the feed rate is increased so that the residence time will decrease. The expanded bead fractions are aged or cured in accordance with customary prior-art practices and are then ready for further processing.

If the particle fractions have not been mixed before expansion, the next step comprises the mixing of the expanded and cured fine-particled coarse-particled fractions mentioned above. This may be done with the use of any suitable mixing equipment. In this mixing operation, it is considered important to use, per one part by weight of the fine-particled fraction, approximately 2.5 to 3.5, and preferably, 3 parts by weight of the coarser-particled fraction referred to above. In contrast to practices in accordance with the present invention, it has been found that a mixture of 1 part by weight of the finer-particled material with 2 parts by weight of the coarser material yields a result, in terms of variation in the absolute volume of the beads as expanded, and consequently in the variation in the density of the product lightweight concrete, which is not substantially better than the variability obtained in accordance with prior-art practices. With a ratio of 1:2.5 to 1:3.5, such as 1:3, however, we have observed a considerable decrease in the variability of the absolute volume of various samples of the expanded beads, and have obtained correspondingly less variation in the properties of the lightweight concretes made from such beads.

The material so produced may then be used in substantially the same way as other prior-art expanded polystyrene materials have been used in the past to obtain lightweight concretes, i.e., mixing with sand (if called for), cement, water, WRA and AEA in the usual proportions for the making of a lightweight concrete of a desired density.

To be more definite, the calculations concerning the selection of the respective amounts to use of various ingredients may be performed as indicated in a brochure entitled "Technical Bulletin — STYROPOR — Styropor Concrete — Components, Mixing, Placing, Proportioning" published by BASF Wyandotte Corporation, Parsippany, N.J., the teachings of which are hereby incorporated by reference. The brochure describes a manner of calculating useful proportions for a mix of lightweight concrete, using, per 0.699 cubic meters (1 cubic yard), between 5.5 and 9 bags (42.6 Kg. or 94 lb. each) of Portland cement, 0.39 to 0.50 parts by weight of water per part of Portland cement, about 5 to 9 percent of entrained air, sufficient sand to yield the desired density, and proper proportions of WRA and AEA. In accordance with a particular example given therein, a lightweight concrete having a compressive strength of 42.2 kilograms per square centimeter (600 pounds per square inch) is obtained with a mix comprising, per 0.699 cubic meter (1 cubic yard), the following:

- Portland cement — 362.4 kg. (799 pounds, 8 1/2 bags)
- Sand — 116.6 kg. (257 pounds)
- Water — 148.8 kg. (328 pounds, 39.5 gallons)
- Beads — 0.6116 m.$^3$(0.8 cubic yards)
- WRA — 502.7 cm.$^3$(17 fluid oz.)
- AEA — According to manufacturer's directions to obtain 3.5% entrained air.

This yields a lightweight concrete intended to having a final specific gravity of 0.753 (47 pounds per cubic foot). The procedures indicated above may be defined as ones for mixing the aggregate with the other materials under conditions such that bead-to-bead contact is substantially avoided.

The procedure involves mixing most of the water and the WRA with beads and then adding the sand and cement, and then towards the end of the mixing procedure, adding the remainder of the water, within which the AEA has been dissolved. The mixing is continued after the final addition of AEA and water for a predetermined time to develop the desired degree of air entrainment (both proportion of AEA and duration of final mixing affect the result).

Yet another factor which is sometimes of considerable importance is the ability of the lightweight concrete to take a finish. In this regard, larger aggregate particles of expanded polystyrene generally give poorer finishability. Within limits, the finishability can be improved by using smaller particles, but in some cases the use of finer particles of expanded polystyrene as aggregate leads to the need for greater proportions of water and leads to the production of a weaker product. In accordance with this invention, lightweight concretes having a finishability adequate for most purposes are produced.

Following the procedures indicated above, it thus is possible to produce lightweight concretes ranging in density from 0.340 to 1.06 grams per cubic centimeter, and having a density that does not depart from a predetermined target value by more than approximately plus or minus 0.024 grams per cubic centimeter (1.5 pounds per cubic foot).

The absolute volume of expanded-bead samples may be determined as follows. There may be taken ten samples of loose, dry expanded beads, each sample having a volume on the order of 1200 to 1500 cubic centimeters. Each sample is placed into a graduated cylinder of suitable capacity, the volume V of the sample being noted. There is then added to the graduated cylinder a measured quantity Q of water, such as approximately 1000 milliliters. Thereafter, a plug closely matching the interior dimensions of the graduated cylinder is inserted into its top and used to force the expanded beads downward until they are substantially all immersed in the water. The water thus occupies all the spaces between various ones of the expanded beads. Being considerably lighter than the water, the beads float toward the surface of the water, leaving in the graduated cylinder a certain volume W of water which is not occupied by beads. It will also be possible to note the total volume T of the bead-water mixture.

From the values V, Q, W and T mentioned above, it is possible to calculate for a sample of beads its absolute volume X, according to the equation $$X = \frac{(T - W) - (Q - W)}{V}$$

After the value X has been determined for a suitable number of samples, such as approximately 10, it becomes possible to calculate, in accordance with a manner familiar to those versed in statistics, the standard deviation $\sigma$ for the observed values of X. The equation for calculating $\sigma$ is $$\sigma = \left[\frac{1}{n-1} \cdot \Sigma (X_i - \bar{X})^2\right]^{\frac{1}{2}}$$

where $n$ is the number of samples and $$\bar{X} = \frac{1}{n} \Sigma X_i$$

The above-mentioned coefficient of variation $C_V$ is calculated from the equation $$C_V = \frac{100\sigma}{\bar{X}}$$

It is the value $C_V$ which should be maintained below 3.0 and preferably at a value such as 1.9 to 2.3, such as about 2.10 or less.

This invention will be made clearer by the following specific Example.

EXAMPLE

There was prepared a mixture of one part by weight of fine-particled expanded polystyrene material with three parts by weight of coarse-particled expanded polystyrene material, both as defined above, and in a quantity sufficient to permit the removal of ten samples, each on the order of 1380 to 1450 cubic centimeters. Observations were taken in respect to the items V, Q, W and T mentioned above, with the following results.

| No. | V, cc. | Q, cc. | T, cc. | W, cc. | X | $(X - \bar{X})^2 \cdot 10^4$ |
|---|---|---|---|---|---|---|
| 1 | 1400 | 1000 | 1900 | 480 | 0.643 | 0.25 |
| 2 | 1380 | 1000 | 1860 | 490 | 0.623 | 2.25 |
| 3 | 1360 | 1000 | 1900 | 470 | 0.662 | 5.76 |
| 4 | 1460 | 1000 | 1900 | 470 | 0.616 | 4.84 |
| 5 | 1400 | 1000 | 1900 | 490 | 0.643 | 0.25 |
| 6 | 1380 | 1000 | 1900 | 490 | 0.652 | 1.96 |
| 7 | 1420 | 1020 | 1920 | 470 | 0.634 | 0.16 |
| 8 | 1400 | 1000 | 1880 | 480 | 0.629 | 0.81 |
| 9 | 1400 | 1000 | 1900 | 500 | 0.643 | 0.25 |
| 10 | 1380 | 1000 | 1880 | 470 | 0.638 | 0.00 |

$$\bar{X} = 0.638 \quad \Sigma(X - \bar{X})^2 = 16.53 \cdot 10^{-4}$$

$$\sigma = \sqrt{\frac{16.53 \cdot 10^{-4}}{9}} = 1.34 \cdot 10^{-2}$$

$$C_V = 100\sigma/\bar{X} = 2.10$$

Lightweight concrete material made from such bead material, according to a standard recipe for producing a lightweight concrete having a specific gravity of 0.641, gave a product having a specific gravity of 0.617 to 0.665 (38.5 to 41.5 pounds per cubic foot, target 40 pounds per cubic foot).

COMPARISON TEST A

Example 1 is repeated, except that for 1 part of expanded fine-particled beads there are used 2 parts of coarse-particled beads. The data for 10 samples shows a considerably greater coefficient of variation.

| No. | V, cc. | Q, cc. | T, cc. | W, cc. | X | $(X - \bar{X})^2 \cdot 10^4$ |
|---|---|---|---|---|---|---|
| 1 | 1400 | 1000 | 1930 | 490 | 0.664 | 5.29 |
| 2 | 1400 | 1000 | 1900 | 480 | 0.643 | 0.04 |
| 3 | 1400 | 1000 | 1900 | 470 | 0.643 | 0.04 |
| 4 | 1420 | 1000 | 1920 | 470 | 0.648 | 0.49 |
| 5 | 1500 | 1000 | 1960 | 440 | 0.640 | 0.01 |
| 6 | 1320 | 1200 | 2000 | 630 | 0.606 | 12.25 |
| 7 | 1400 | 1000 | 1450 | 500 | 0.679 | 14.44 |
| 8 | 1250 | 1200 | 2000 | 720 | 0.640 | 0.01 |
| 9 | 1300 | 1200 | 1980 | 620 | 0.600 | 16.81 |
| 10 | 1440 | 1000 | 1930 | 470 | 0.646 | 0.25 |

$$\bar{X} = 0.641 \; \Sigma (X - \bar{X})^2 = 49.63 \cdot 10^{-4}$$

$$\sigma = \sqrt{\frac{49.63 \cdot 10^{-4}}{9}} = 2.35 \cdot 10^{-2}$$

$$C_V = 100\sigma / \bar{X} = 3.67$$

COMPARISON TEST B

Example 1 is repeated, except that the material was different: 1 part of the fine-particled material, 2.5 parts of coarse-particled material (both as described above) and 0.2 part of extremely fine polystyrene material, derived from unexpanded beads in the range of 0.41 to 0.63 millimeter in diameter. A similar test to determine coefficient of variation $C_V$ was conducted.

| No. | V, cc. | Q, cc. | T, cc. | W, cc. | X | $(X - \bar{X})^2 \cdot 10^4$ |
|---|---|---|---|---|---|---|
| 1 | 1380 | 1010 | 1900 | 520 | 0.645 | 15.21 |
| 2 | 1400 | 1000 | 1860 | 510 | 0.614 | 0.64 |
| 3 | 1380 | 1000 | 1830 | 530 | 0.601 | 0.25 |
| 4 | 1400 | 1000 | 1790 | 510 | 0.564 | 17.64 |
| 5 | 1420 | 1010 | 1840 | 510 | 0.585 | 4.41 |
| 6 | 1400 | 1010 | 1900 | 510 | 0.636 | 9.00 |
| 7 | 1440 | 1000 | 1860 | 490 | 0.597 | 0.81 |
| 8 | 1400 | 1000 | 1870 | 520 | 0.621 | 2.25 |
| 9 | 1400 | 1000 | 1840 | 510 | 0.600 | 0.36 |
| 10 | 1380 | 1000 | 1820 | 520 | 0.594 | 1.44 |

$$\bar{X} = 0.606 \; \Sigma \; 52.01 \cdot 10^{-4}$$

$$\sigma = \sqrt{\frac{52.01}{9}} \cdot 10^{-2} = 2.40 \cdot 10^{-2}$$

$$C_V = 100\sigma / \bar{X} = 3.96$$

Those skilled in the statistics will appreciate that the significance of $C_V$ is that it expresses, in terms of percent, the change, plus or minus, that amounts to one "standard deviation" or "sigma". In a standard distribution, about 68 percent of all observations come within 1 sigma of the mean or average value, and about 95 percent fall within the range of mean plus or minus twice the sigma. To capture substantially all the observations, it is necessary to use a range of the mean plus or minus triple the sigma. Thus, the materials of Comparison Tests A and B, which perform about as well as the prior art, give variations in the absolute-volume factor that in about one case in twenty are high or low by 7 to 10 or 11 percent, whereas with a $C_V$ of 2.1, the material of Example 1 is nearly never off by any more than 6.3 percent, and is within 4.2 percent nineteen times in twenty.

The $C_V$ is affected by various factors, including the screening done to prepare the fractions of unexpanded beads, the care with which expansion of the beads is conducted, and the thoroughness of the mixing of the fractions of expanded beads. It is also influenced, we have discovered, by the proportions in which the expanded fractions are mixed, and in a way that could not have been determined, except empirically. The discovery that it is possible, using the particular coarse-particled and finer-particled fractions of beads, mixed in the proportions and expanded as herein taught, to obtain such a substantially less variable lightweight aggregate, and thereby avoid a substantial proportion of the unwanted variability in the density of the product and its other properties, is thus a valuable and unobvious contribution to the art of making lightweight-concrete compositions.

While we have shown and described herein certain embodiments of our invention, we intend to cover as well any change or modification therein which may be made without departing from its spirit and scope.

We claim:

1. The method of making lightweight concrete having a density of 0.340 to 1.060 grams per cubic centimeter which comprises mixing with cement, water, water-reducing admixture and air-entraining agent an aggregate material consisting essentially of a mixture of first and second portions of particles of polystyrene expanded to a density of 0.013 to 0.019 grams per cubic centimeter, said particles being of controlled size such that said first portion thereof consists of beads which in their unexpanded form are substantially all of a diameter between 1.04 and 0.35 millimeters and 90 percent by weight of a diameter between 0.9 and 0.4 millimeters, and said second portion thereof consists of beads which in their unexpanded form are substantially all of a diameter between 1.29 and 0.35 millimeters and 90 percent by weight of a diameter between 1.24 and 0.58 millimeters, said portions being admixed in a weight ratio of 2.5 to 3.5 parts by weight of said second portion per one part by weight of said first portion, the mixture of particles being of such uniformity that ten samples each of approximately 1200 to 1500 cubic centimeters in volume of loose and dry expanded beads exhibit a co-efficient of variation $C_V$ in respect to absolute-volume factor of under 3.0, said aggregate being mixed with water, cement, water-reducing admixture, air-entraining agent and optionally sand to form said lightweight concrete under conditions such that bead-to-bead contact is substantially wholly avoided.

2. A method as defined in claim 1, characterized in that said aggregate material is mixed with cement, water-reducing admixture and air-entraining agent, sand in an amount of up to approximately equal to the weight of the cement, and water in an amount of 0.39 to 0.50 parts by weight per part of cement.

3. A lightweight concrete made according to the method of claim 2.

4. A method as defined in claim 1, said coefficient of variation $C_V$ being 1.9 to 2.3.

* * * * *

UNITED STATES PATENT AND TRADEMARK OFFICE
CERTIFICATE OF CORRECTION

PATENT NO. : 4,040,855
DATED : August 9, 1977
INVENTOR(S) : Arthur A. Rady-Pentek et al.

It is certified that error appears in the above-identified patent and that said Letters Patent are hereby corrected as shown below:

Column 2, line 48, "favourable" should read --unfavorable--.

Signed and Sealed this

Eighth Day of November 1977

[SEAL]

Attest:

RUTH C. MASON
Attesting Officer

LUTRELLE F. PARKER
Acting Commissioner of Patents and Trademarks